United States Patent
Kim

(10) Patent No.: US 6,215,980 B1
(45) Date of Patent: Apr. 10, 2001

(54) APPARATUS AND METHOD FOR SAVING BATTERY POWER OF A PAGING RECEIVER

(75) Inventor: Jae-Bin Kim, Yongin (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 09/088,172

(22) Filed: Jun. 1, 1998

(30) Foreign Application Priority Data

| May 31, 1997 | (KR) | 97-22562 |
| Jan. 13, 1998 | (KR) | 98-649 |
| Mar. 4, 1998 | (KR) | 98-7164 |

(51) Int. Cl.$^7$ .................................................. H04Q 7/00
(52) U.S. Cl. ........................ 455/38.3; 455/32.1; 455/343; 340/825.44
(58) Field of Search .................................. 455/38.3, 32.1, 455/343; 340/825.2, 825.52, 825.44, 825.14

(56) References Cited

U.S. PATENT DOCUMENTS

| 5,150,954 | * | 9/1992 | Hoff | 340/825.44 |
| 5,155,479 | * | 10/1992 | Ragan | 340/825.44 |
| 5,168,271 | * | 12/1992 | Hoff | 340/825.44 |
| 5,230,084 | * | 7/1993 | Nguyen | 455/38.3 |
| 5,239,668 | * | 8/1993 | Davis | 455/429 |
| 5,309,153 | * | 5/1994 | Gaskill et al. | 340/825.44 |
| 5,384,564 | * | 1/1995 | Wycoff et al. | 340/825.44 |
| 5,530,911 | * | 6/1996 | Lerner et al. | 455/38.3 |
| 5,537,100 | * | 7/1996 | Hallberg | 340/825.21 |
| 5,537,415 | * | 7/1996 | Miller et al. | 370/314 |
| 5,542,115 | * | 7/1996 | Wong et al. | 455/31.3 |
| 5,726,640 | * | 3/1998 | Jones et al. | 340/825.22 |
| 5,822,689 | * | 10/1998 | Hwang | 455/343 |

* cited by examiner

Primary Examiner—Dwayne D. Bost
Assistant Examiner—Erika A. Gary
(74) Attorney, Agent, or Firm—Dilworth & Barrese, LLP

(57) ABSTRACT

An apparatus and method for saving a battery of a paging receiver. The apparatus includes a paging terminal for sequentially assigning time slots by the unit of a POCSAG code, and generating the first batch following a preamble as a header batch with respect to each POCSAG code, and the paging receiver for receiving the POCSAG code transmitted from the paging terminal to detect the header batch, and turning off a power source of a radio frequency unit when time slot information contained in the header batch does not correspond to the time slot of the paging receiver.

15 Claims, 15 Drawing Sheets

APPARATUS AND METHOD FOR SAVING BATTERY POWER OF A PAGING RECEIVER

BACKGROUND OF THE INVENTION

1. Field of the Invention

The present invention generally relates to paging receivers and, more particularly, to an apparatus and method for saving battery power of a paging receiver when receiving messages.

2. Description of the Related Art

A Post Office Code Standardization Advisory Group (POCSAG) system, which is one of the current protocols used for paging receivers, transmits data asynchronously. Another currently used protocol is the FLEX™ Paging Protocol by Motorola, which employs a high speed paging system that transmits data synchronously. Referring to FIG. 1A, a diagram of a prior art POCSAG protocol signal used in a paging receiver is shown. The transmission of POCSAG is of a digital format and begins with preamble data of 576 bits followed by a plurality of batch data (generally 30 to 60 batches) which consists of address and message codewords. Particularly, one batch begins with a 32-bit synchronization codeword ("word sync") followed by 8 frames each having 64 bits. Each frame has a duration equivalent to two codewords, i.e., a 32-bit address codeword and a 32-bit message codeword. Therefore, one batch consists of 544 bits of data, seventeen words of 32 bits.

Referring now to FIG. 1B, a structure of a combined channel with POCSAG and FLEX system having collapse information equal to 4, as well as an operating waveform BS of a conventional paging receiver at that channel is shown.

Generally, a conventional paging receiver of a paging system includes a radio frequency (RF) circuit which is repeatedly turned on and off at regular intervals in order to detect the presence or absence of a signal such as preamble data, for example, to detect an incoming message or call. Hence, the RF circuit of the paging receiver is energized irrespective of whether or not the paging receiver is receiving its corresponding signal. Consequently, power is unnecessarily expended thereby reducing the life of the battery of the paging receiver.

SUMMARY OF THE INVENTION

It is an object of the present invention to provide a system and method for conserving the power consumed from a battery during call reception in a paging receiver.

It is another object of the present invention to provide a system and method for minimizing the power consumed from a battery while detecting a self signal of a paging receiver in a POCSAG paging signaling system.

It is still another object of the present invention to provide a system and method for minimizing the power consumed from a battery while detecting a self signal of a POCSAG paging receiver at a combined channel using the POCSAG system and a FLEX system.

In one aspect of the present invention, an apparatus for saving battery power of a paging receiver having a radio frequency unit comprises a paging terminal for receiving a paging message, generating a POCSAG code in accordance with the paging message and sequentially assigning a corresponding time slot for transmission of the POCSAG, the POCSAG code having preamble data and a first batch as a head batch following the preamble, the header batch having time slot information associated with the paging receiver, whereby the paging receiver receives the POCSAG code transmitted from the paging terminal and detects the header batch, the paging receiver controlling the battery power of the radio frequency unit in accordance with the time slot information contained in the header batch.

In another aspect of the present invention, a method for saving a battery in a paging receiver having a decoder for decoding frame data to an original paging message, determining whether a data batch is POCSAG data based on a time slot number contained in a header batch, and means for communicating with a paging terminal through a combined channel, comprises the steps of: supplying a power source to a radio frequency unit, and assigning a header address for receiving the header batch and a data address for receiving the data batch to the decoder; determining whether one of the header address and the data address is detected; holding the decoder and setting a time of a decoder hold timer if only the header address is detected; and checking the time of the decoder hold timer, and if the setting time of the decoder hold timer elapses, releasing a hold state of the decoder and returning to the determining step.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

In the following description of preferred embodiments, specific details are set forth to provide a more thorough understanding of the present invention. It is to be understood, however, that a detailed description of functions or constructions related to the present invention which are known by those of ordinary skill in the art will not be provided where such description would obscure the subject matter of the present invention.

Figure 2:
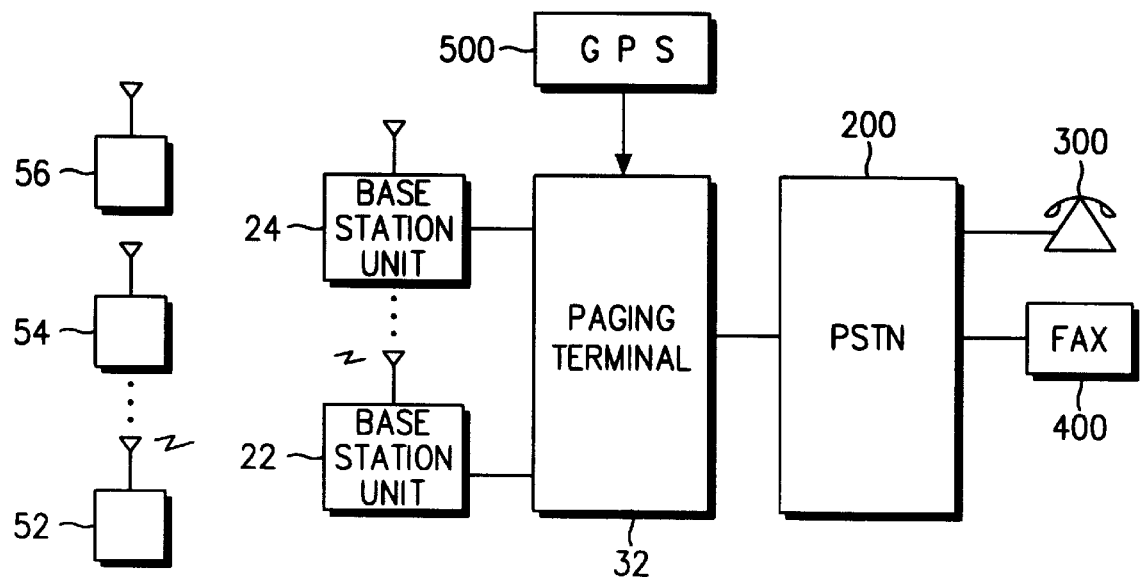
FIG. 2 is a block diagram of a conventional paging signaling system in which the present invention may be implemented.

Referring now to FIG. 2, a block diagram of a conventional paging signaling system in which the present invention may be implemented is shown. When a user requests to transmit a paging message through, e.g., a telephone 300 or a facsimile 400, the paging message is transmitted to a paging terminal 32 through a switching system or a public switched telephone network (PSTN) 200. The paging terminal 32 call-signaling-protocols the paging message. If the call-signaling-protocol message is a POCSAG signal, the paging terminal 32 determines an accurate time slot for transmission of the POCSAG signal by using information received from a Global Positioning System (GPS) 500 and transmits the POCSAG signal to a corresponding one of a plurality of paging receivers 52 through 56 via one or more of a plurality of base station units 22 through 24 during the determined time slot. The GPS 500 is an automatic positioning system which receives time and position data from 24 satellites and computes the current 3-dimensional position and time by using the principle of triangulation.

Figure 1A:
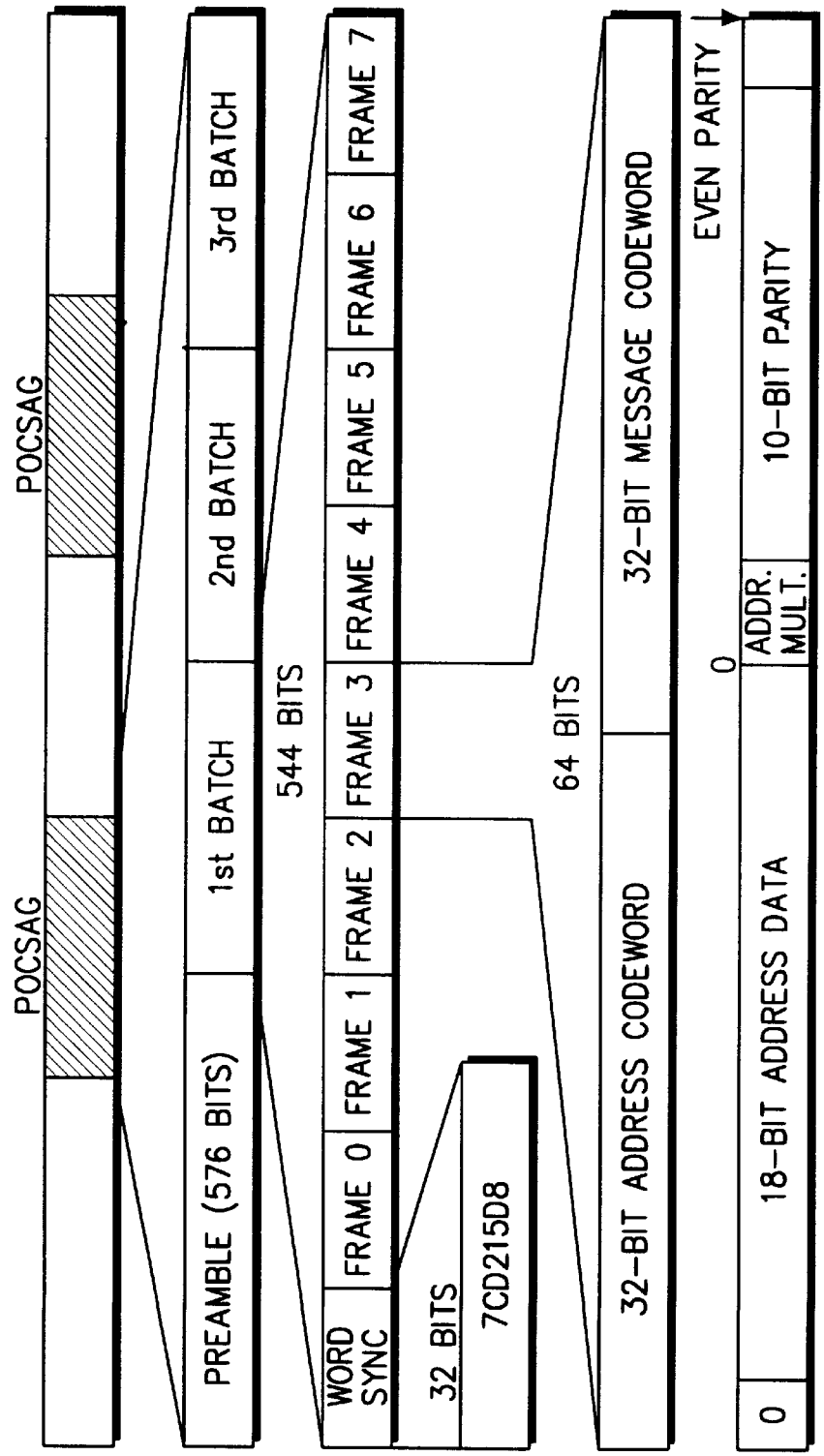
FIG. 1A is a diagram illustrating the structure of a prior art POCSAG protocol code used in a paging receiver.
Figure 1B:
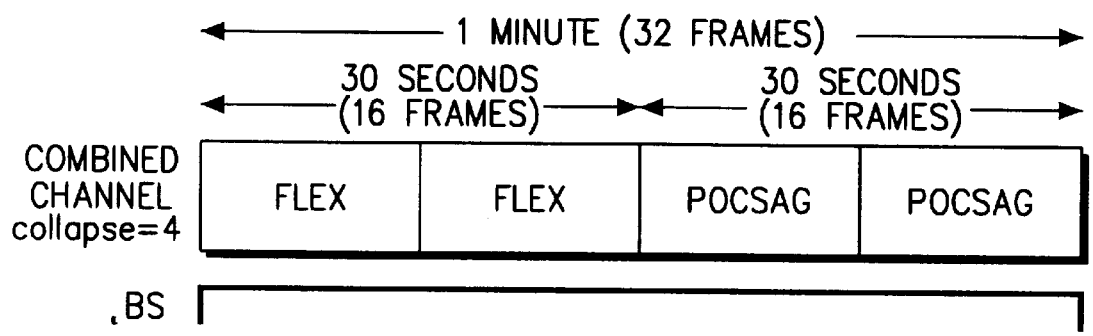
FIG. 1B is a diagram illustrating a structure of a combined channel of a POCSAG and FLEX system having collapse information equal to 4, and an operating waveform of a conventional paging receiver at that channel.
Figure 3:
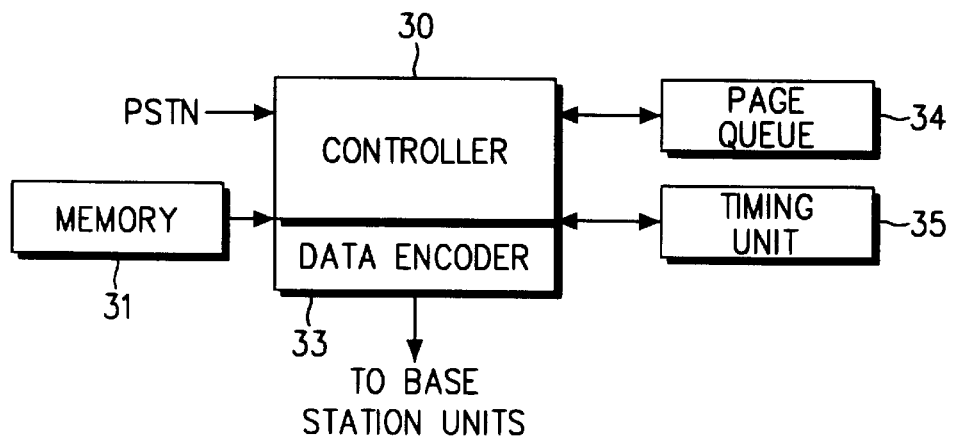
FIG. 3 is a block diagram of a paging terminal illustrated in FIG. 2.

Referring to FIG. 3, a block diagram of the paging terminal 32 of FIG. 2 is shown. A controller 30 controls the reception and transmission of the paging message received through the PSTN 200. A memory 31 is connected to the controller 30 for storing information about the paging receivers of the paging system such as an address of the paging receiver, a message type (voice, numeric or alphanumeric), and time slot group information. The time slot group information is previously designated by the paging system and is based on the address of the paging receiver. Referring again to FIG. 1A, the 32 bit address codeword consists of one address/data identification bit (bit 1), an 18-bit address portion (bits 2–19), a 2-bit address multiplier portion (bits 20 and 21), a 10-bit parity portion (bits 22–31), one block check bit (bit 32). The time slot group information is determined by using information of the address portion, i.e, whether the information value of the address portion is an even or odd number. Alternatively, the time slot group information may be determined on the basis of a remainder obtained by dividing the information value of the address portion by 2 or more.

A page queue 34, which is connected to the controller 30, temporarily stores the paging message in a standby state when received through the PSTN 200. An area is divided in the page queue 34 so as to store the time slot corresponding to the time slot group information. A data encoder 33 converts the paging message in the page queue 34 into the POCSAG signal which can be transmitted to the corresponding paging receiver 52–56 through a corresponding one of the base station units 22–24. A timing unit 35 controls timing necessary for the operation of the paging terminal 32.

Figure 4:
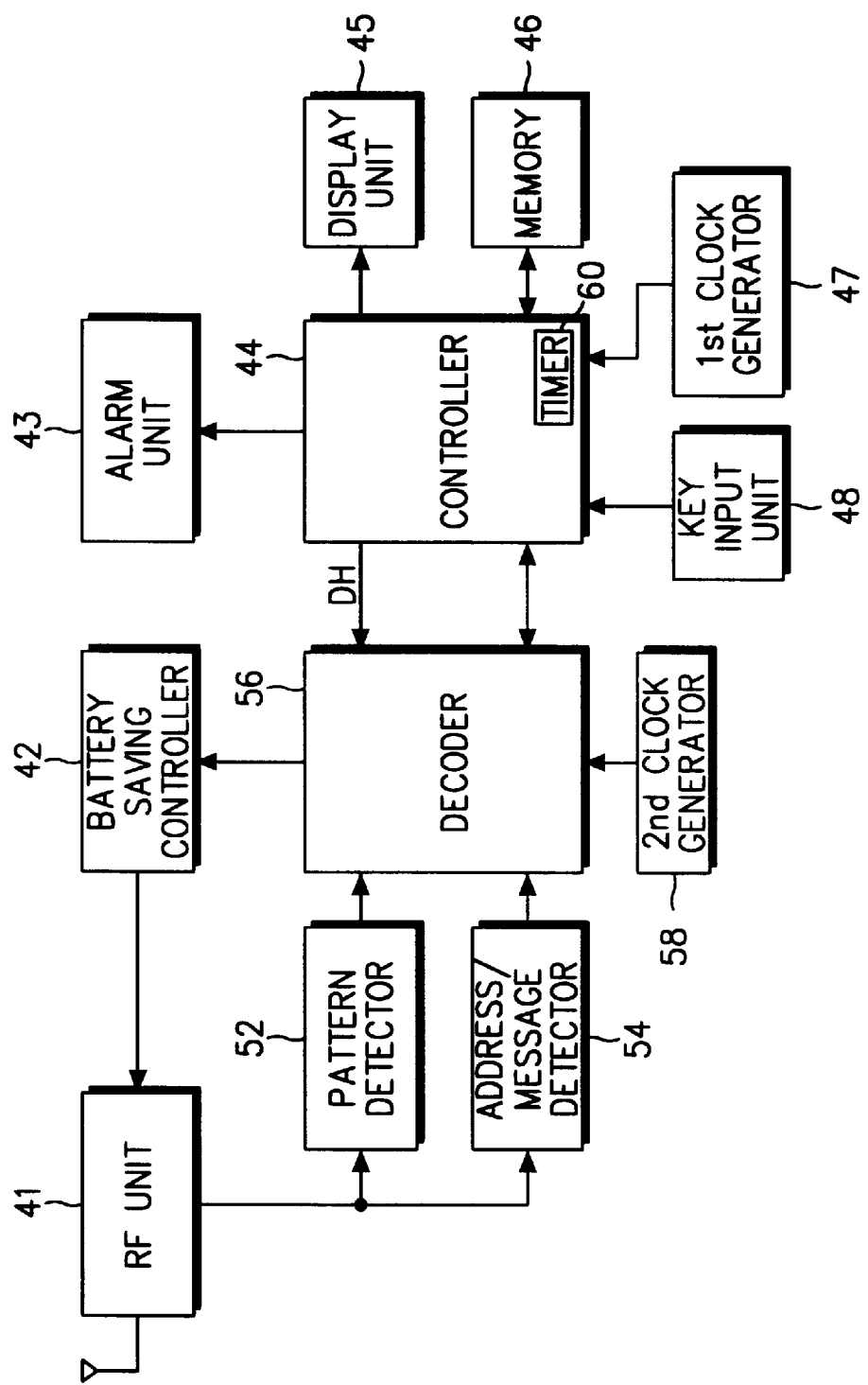
FIG. 4 is a block diagram of a paging receiver in accordance with an embodiment of the present invention.

Referring now to FIG. 4, a block diagram of a paging receiver in accordance with an embodiment of the present invention is shown. An RF unit 41 receives paging information and performs functions such as frequency conversion, demodulation and waveform shaping, and then outputs digitally converted paging information. A pattern detector 52 detects the preamble data from the digital signal output from the RF unit 41. An address/message detector 54 detects an address or a message of the digital signal output from the RF unit 41. A battery saving controller 42 turns on or off a power source (not shown) of the RF unit 41 under the control of a controller 44.

A decoder 56 sets an operating mode of the paging receiver under the control of the controller 44. In an idle mode, the decoder 56 controls the power supplied to the RF unit 41 so that the pattern detector 52 can detect the preamble data. In a batch mode, the decoder 56 controls the power supplied to the RF unit 41 so that the address/message detector 54 may detect word sync data and frame data. Further, the decoder 56 decodes the detected frame data into its original data form. A second clock generator 58 controls the operation timing of the decoder 56.

The controller 44 receives and processes the decoded data provided from the decoder 56, and controls operation of an alarm unit 43. In addition, the controller 44 generates a decoder hold signal DH which causes the decoder 56 to turn off the power source of the RF unit 41 via the battery saving controller 42. The alarm unit 43 may be any conventional vibrator or a buzzer. In response to an alarm control signal received from the controller 44, the alarm unit 43 generates an alarm signal (e.g., a tone signal or a vibration signal) to indicate that a call is received. A display unit 45 displays a message from the caller, as well as status information of the paging receiver, by a display control signal generated from the controller 44. A memory 46 stores data such as the unique address information assigned to the paging receiver, frame information and received messages.

A first clock generator 47 supplies clock signals to the controller 44 which are necessary for the operation of the paging receiver. A timer 60 of the controller 44 is used to sense the state of the time slot repeated with a constant time length. A key input unit 48, which is user interface means, has a plurality of keys which are used to set one of a plurality of modes of the paging receiver as well as to confirm the paging message.

Figure 5:
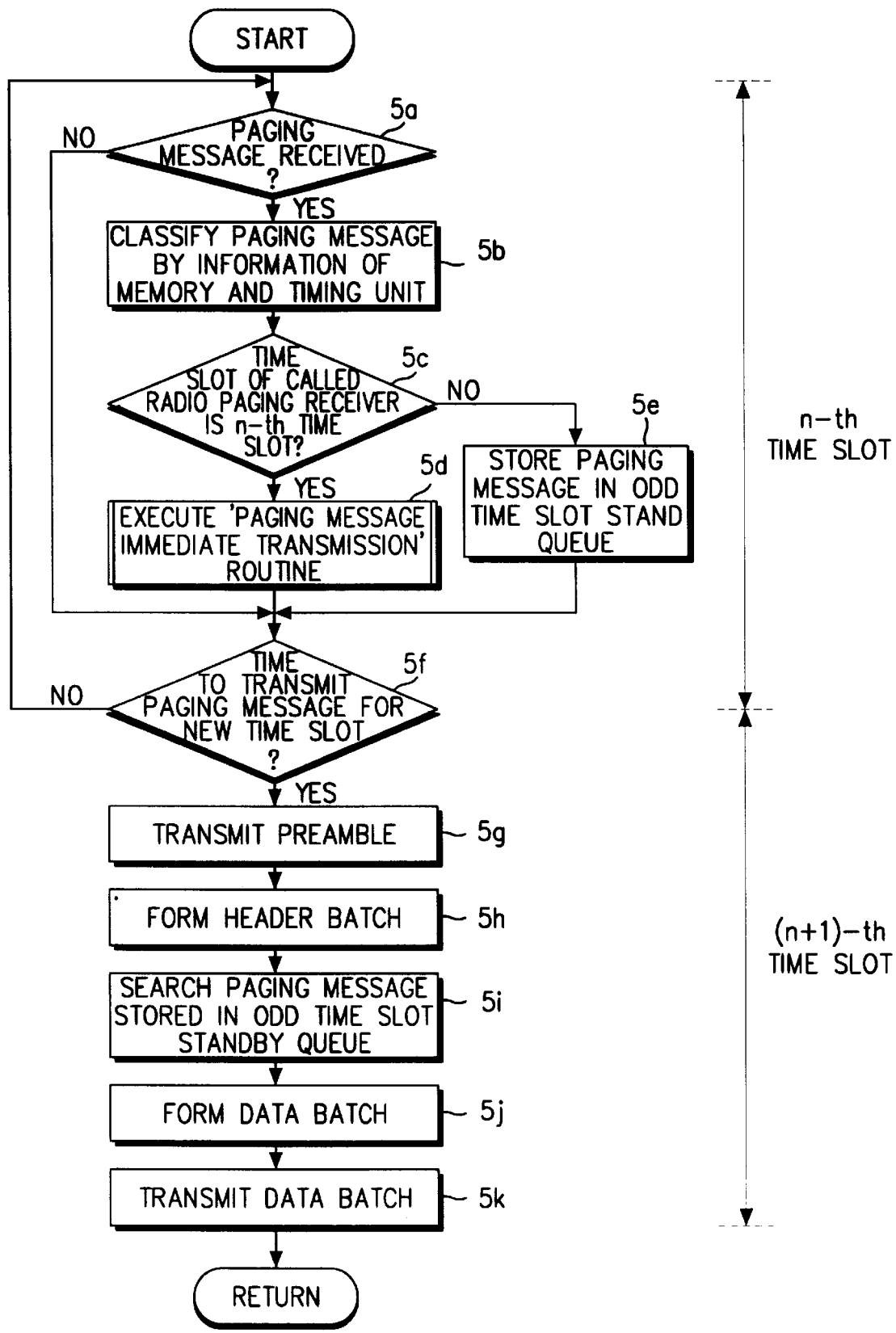
FIG. 5 is a flow diagram illustrating an operating process of a paging terminal in accordance with the present invention.

Referring now to FIG. 5, a flow diagram illustrating an operation of the paging terminal 32 in accordance with the present invention is shown. In FIG. 5, it is assumed that a paging request generated at any time slot is immediately transmitted at that time slot or the paging request is transmitted at the next time slot. The flow chart of FIG. 5 is divided into an operation at an n-th time slot, a current time slot, and an operation at an (n+1)-th time slot, the next time slot (where n is an even number).

The paging terminal 32 shown in FIGS. 2 and 3 checks whether a paging message is received through the PSTN 200 (step 5a). As discussed above, the paging message is inputted by the user through, e.g., a telephone or facsimile and transmitted to the paging terminal 32 through the PSTN 200. When the paging message is received, it is classified with reference to information stored in memory 31 and the timing unit 35 (step 5b). Specifically, a CAP (Code Assignment Plan) code corresponding to the paging receiver (which is contained in the paging message) is calculated to check whether the called paging receiver belongs to an odd or even-numbered time slot group. Since the paging terminal 32 only processes a subscriber call having an even CAP code number during an even-numbered time slot and a subscriber call having an odd CAP code number during an odd-numbered time slot, the paging receivers are classified into an even or odd-numbered time slot group depending on the designated time slot.

Next, a determination is made as to whether a current time slot is identical to the time slot of the called paging receiver (step 5c). If the time slot assigned to the called paging receiver is an even-numbered time slot, the paging message may be immediately transmitted under the state that messages for other called paging receivers belonging to the even-numbered time slot group have been processed. In particular, whether the paging message is immediately transmitted at a corresponding time slot depends on factors such as the number of other paging messages to be transmitted at the same frame and the length of each message. If the paging message can not be transmitted at a current time slot, it should be placed in a standby state until the next even-numbered time slot. Then the paging message should be stored in a memory (queue). As stated above, for purposes of the following description of preferred embodiments, these circumstances are disregarded and it is assumed that the paging message is immediately transmitted. Accordingly, referring back to FIG. 5, if the time slot of the called paging receiver is not identical to an n-th time slot (negative result in step 5c), the paging message is stored in an odd-numbered time slot standby queue (step 5e). If the time slot is identical to the n-th time slot (affirmative result at step 5c), a paging message immediate transmission routine is executed (step 5d).

Next, a determination is made as to whether it is time to transmit the paging message for a new time slot (step 5f). This determination is made even if the paging message is not received (negative result in step 5a). If it is determined that it is not time to transmit the paging message for the new time slot (negative result in step 5f), process returns to step 5a. If it determined that it is time to transmit the paging message for the new time slot (affirmative result in step 5f), the paging message of the standby state (at step 5e) is transmitted. Like the even (n-th) time slot, the paging message request may be sensed at the odd ((n+1)-th) time slot. However, only an operation for processing the paging message stored in the odd-numbered time slot standby queue at the odd-numbered time slot will be described in detail.

Next, the preamble and word sync is transmitted (step 5g). A header batch is then formed (step 5h). In this instance, the state of a traffic bit should be 1. Next, the paging message stored in the odd-numbered time slot standby queue is searched (step 5i). A data batch consisting of a data address and a data message is formed (step 5j) and the data batch is transmitted (step 5k).

Figure 6:
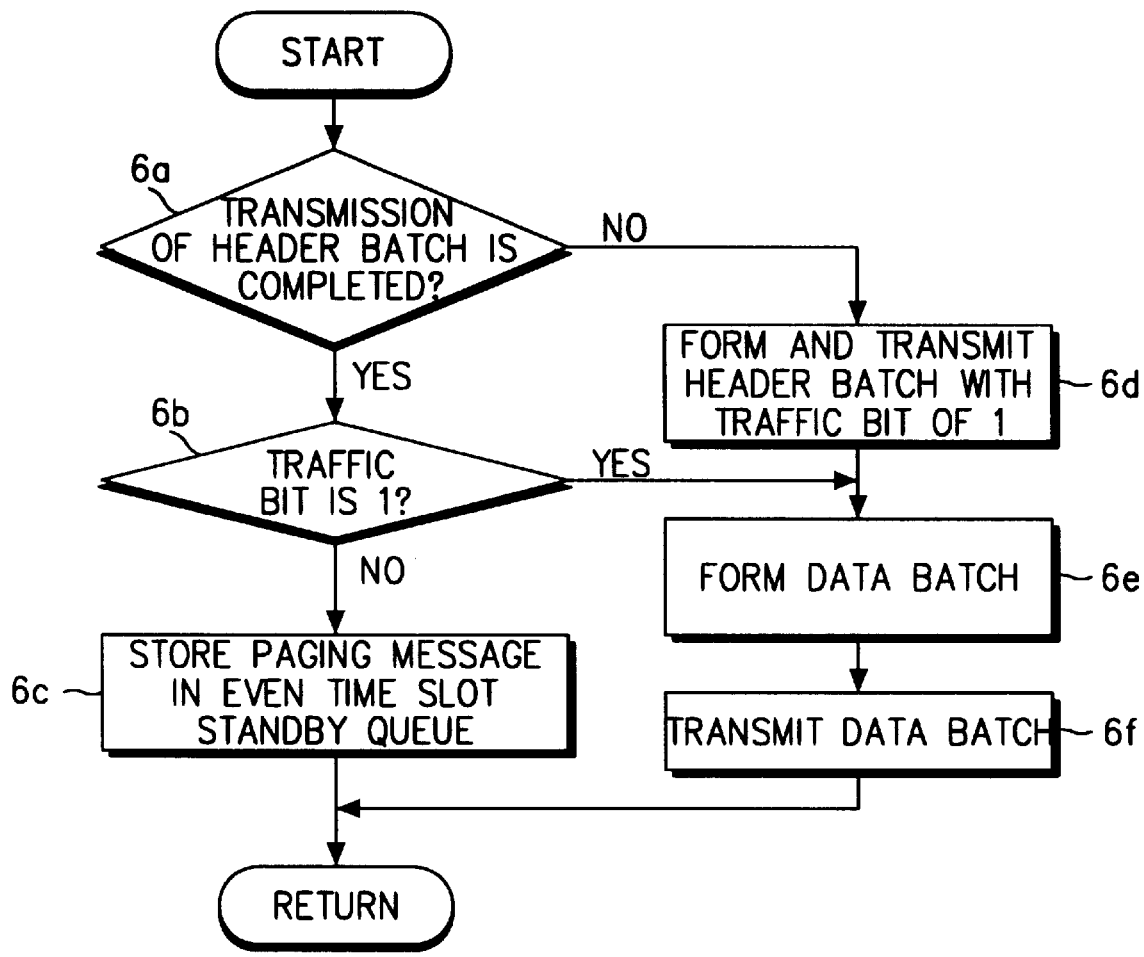
FIG. 6 is a flow diagram illustrating a paging message immediate transmission routine shown in FIG. 5.

Referring now to FIG. 6, a flow diagram of the paging message immediate transmission routine (of step 5d) of FIG. 5 is shown. The paging terminal 32 checks whether the header batch has been transmitted at a corresponding time slot (step 6a). If the header batch has been transmitted (affirmative result in step 6a), a determination is made as to whether the traffic bit contained the header batch is logic 0 or logic 1. If the traffic bit is logic 0, the paging receiver will turn off the power source (described in detail below with reference to FIG. 7). On the other hand, if the traffic bit is logic 1, the power source is not turned off. If the header batch having a traffic bit of logic 0 is transmitted, there is no use to transmit the paging message. Therefore, if it is determined that the traffic bit is logic 0 (negative result in step 6b), the paging message is stored in an even-numbered time slot standby queue (step 6c). The stored paging message will then be transmitted at the next even-numbered time slot.

On the other hand, if the header batch has not been transmitted (negative result in step 6a) (i.e., if it is time to start to transmit the preamble or if the preamble is being transmitted) a header batch having a traffic bit of logic 1 is formed and transmitted (step 6d) after the preamble has been transmitted. Next, a data batch consisting of the data address and the data message is formed (step 6e) and the data batch is transmitted (step 6f).

Figure 7:
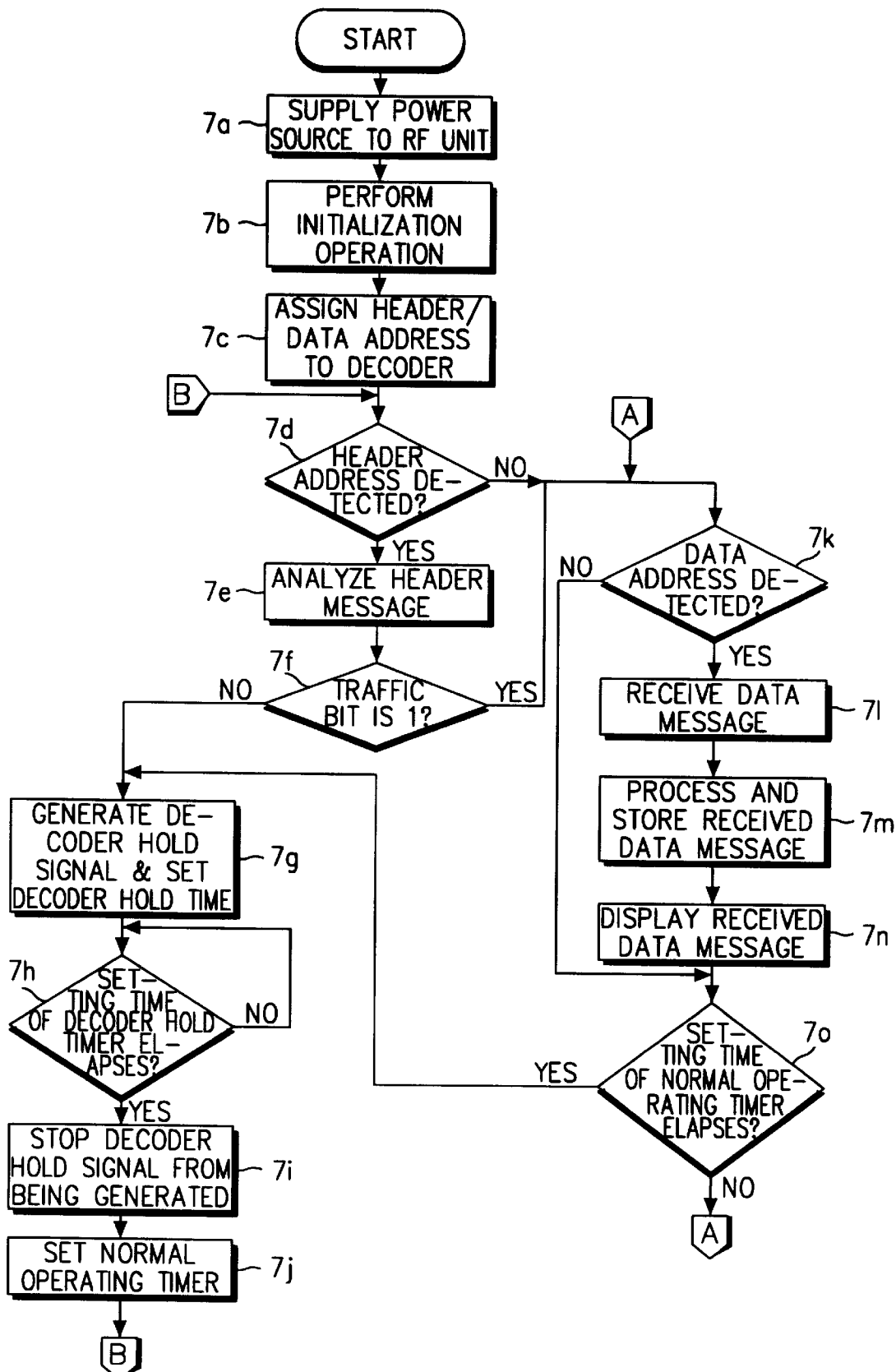
FIG. 7 is a flow diagram illustrates an operation of a paging receiver in accordance with the present invention.

Referring now to FIG. 7, a flow diagram of an operation of a paging receiver in accordance with the present invention is shown. In a standby state, the controller 44 of the paging receiver supplies a power source to the RF unit 41 (step 7a), and then performs an initialization operation (step 7b). During initialization, a normal operating timer (which can normally operate the decoder 56) is set to approximately 15 seconds. In addition, a decoder hold timer (which prevents the decoder 56 from operation for a corresponding time) is released. Next, a header/data address (or CAP code) is assigned to the decoder 56 (step 7c) so that the header batch and the data batch can be extracted from a signal received by the RF unit 41.

Next, a determination is made as to whether the header address is detected (step 7d). If the header address is detected (affirmative result at step 7d), the header message is analyzed (step 7e) to determine if the current time slot corresponds to the time slot designated for the paging receiver ("receiver time slot"). If the current time slot corresponds to the receiver time slot, the state of the traffic bit is checked (step 7f). It is assumed that a traffic bit of logic 0 represents that there is no data batch to be transmitted whereas a traffic bit of logic 1 represents that there is a data batch to be transmitted. Accordingly, if it is determined that the traffic bit is logic 0 (negative result in step 7f), the decoder hold signal DH is generated and the decoder hold time is set to a corresponding time slot (step 7g), thereby turning off the power source of the RF unit 41 during that time. Next, the decoder hold timer is checked to determine if the time set for the decoder hold timer has elapsed (step 7h). If the setting time has elapsed (affirmative result in step 7h), the decoder hold signal DH is prevented from being generated (step 7i) so as to supply a normal power source. The normal operating timer is then set (step 7j) and execution returns to step 7d.

If, on the other hand, the traffic bit is logic 1 (affirmative result at step 7f), a determination is made as to whether the data address is detected (step 7k). If the data address is detected (affirmative result at step 7k), the data message is received from the decoder (step 7l). The received data message is processed and stored (step 7m). The received data message is displayed through the display unit 45 and aurally transmitted through the alarm unit 43 (step 7n). Next, a determination is made as to whether the setting time of the normal operating timer has elapsed (step 7o). Moreover, even if the data address is not detected (negative result at step 7k), the setting time of the normal operating timer is checked to see if it has elapsed (step 7o). If the setting time has not elapsed (negative result in step 7o), execution returns to step 7k. The elapse of the time set in the normal operating timer corresponds to the point at which the time permitted to a self time slot elapses. That is, if the self time slot is an even-numbered time slot, the fact that the time permitted to the self time slot elapses represents that it is time to start a new odd-numbered time slot. By driving the decoder hold timer in accordance with the setting time, the decoder 56 will not be operated during the next time slot except the self time slot.

Next, if the header address is not detected (negative result at step 7d), it is determined if the data address is detected (step 7k). This is done because a situation may arise during a normal operation that the data address is detected even though the header address is missed without any reason.

Figure 8:
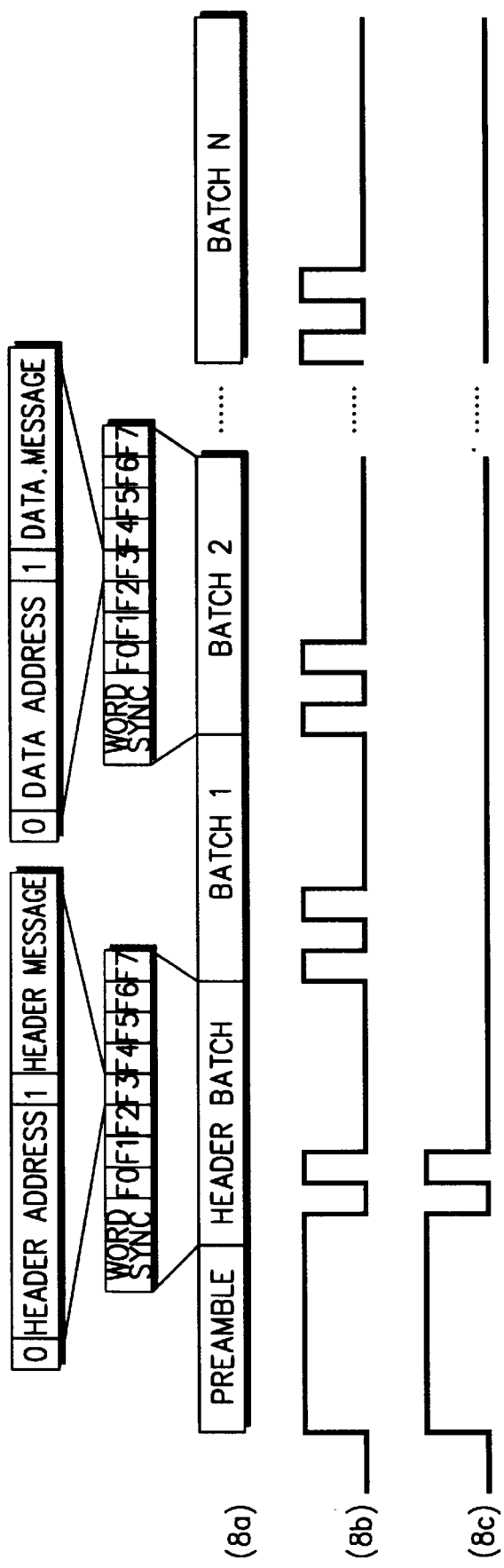
FIGS. 8A to 8C are timing diagrams illustrating a battery saving state of a paging receiver for one time slot in accordance with the present invention.

Referring now to FIGS. 8A through 8C, timing diagrams illustrating a battery saving state of a paging receiver for one time slot in accordance with the present invention are shown. In particular, FIG. 8A illustrates a structure of one time slot with a constant time length. FIG. 8B illustrates that the power source is normally supplied to the RF unit during a data batch stream when a current time slot is determined as the receiver time slot by detecting the preamble and checking the header batch. FIG. 8C illustrates that the power supplied to the RF unit is cut off during the data batch stream when the current time slot is not the receiver time slot. In this situation, the paging receiver does not receive the data batch information during the current time slot and does not operate as the receiver by a decoder holding operation.

Figure 9:
FIGS. 9A to 9C are timing diagrams illustrating a battery saving state of a paging receiver for a plurality of time slots in accordance with the present invention.

FIGS. 9A to 9C are timing diagrams illustrating a battery saving state of the paging receiver for a plurality of time slots. In particular, FIG. 9A illustrates a the form of the transmission of the time slots with each time slot having constant time length. FIG. 9B shows a battery consuming state when the time slot of the paging receiver is an odd-numbered time slot. FIG. 9C shows a battery consuming state when the time slot of the paging receiver is an even-numbered time slot. In the inventive control method, only about 50% of the conventional power is consumed (assuming of course that power consumption of the conventional paging receiver is 100%). In addition, if the traffic bit is 0, only the preamble is detected and the RF unit 41 is turned off until the corresponding data batch and the next time slot. Then only about 3.33% of the conventional power is consumed (again assuming that the power consumption of the conventional paging receiver is 100%).

As shown, when the time slots with constant time length are transmitted, the paging receiver checks the preamble and the header batch. If the current time slot is not the receiver time slot, the RF unit 41 is turned off. On the other hand, if the current time slot is the receiver time slot, the RF unit 41 is turned on. It is to be appreciated that, since the RF unit 41 is only turned on if the current time slot is the receiver time slot, there is no consumption of the battery when the current time slot is not the self time slot and, therefore, the power is saved.

Figure 10:
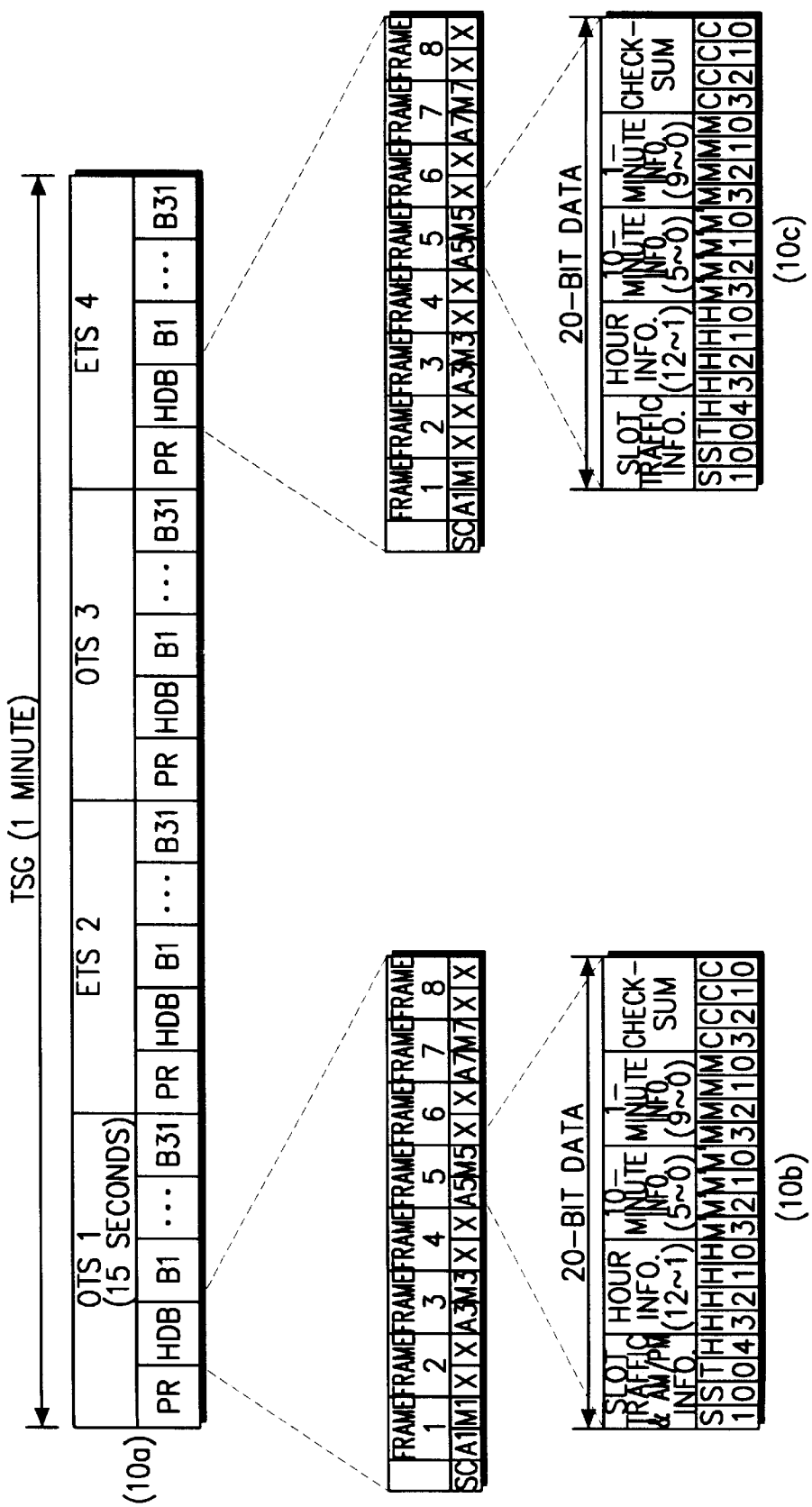
FIGS. 10A to 10C illustrate a structure of a time slot in accordance with an embodiment of the present invention.

Referring now to FIGS. 10a through 10c, a structure of a time slot in accordance with the present invention is shown. In particular, FIG. 10a illustrates one time slot group (TSG) consisting of 4 time slots. In FIG. 10a, reference symbols OTS1 and OTS2 designate odd-numbered time slots; ETS2 and ETS4 represent even-numbered time slots; B1–B31 refer to data batches; PR refers to the preamble data; and HDB refers to the header batch. Assuming that each time slot has a duration of 15 seconds, one TSG has a duration of one minute.

FIG. 10B illustrates a construction of the header batch (HDB) contained in the odd-numbered time slot (OTS) and FIG. 10c illustrates a construction of the header batch contained in the even-numbered time slot (ETS). Referring to FIG. 10b, 2 time slot information bits S0 and S1 are assigned to the message data constituting any one frame of the header batch of the odd-numbered time slot. Preferably, the time slot group (TSG) consists of 4 time slots because there are 4 numbers, for example, 1, 2, 3 and 4, designated by the 2 bits. Although the fundamental construction shown in FIGS. 10b and 10c are similar, the frame having information is determined depending on whether the time slot is an even or odd-numbered time slot within one time slot group. In other words, the first frame in FIG. 10b has address data A1 and message data M1 since OTS1 is an odd-numbered time slot, whereas the second frame has no data (designated by X X). The first frame in FIG. 10c has no data since ETS4 is an even-numbered time slot, whereas the second frame has address data A2 and message data M2. The traffic information T is one bit. Since the transmission of data is reduced in the night, the paging terminal transmits only the preamble and the header batch when there is no data transmission. Therefore, the consumption of the battery can be reduced. For example, the traffic information bit of 0 means that there is no data batch. Hence, the paging receiver turns off the RF unit 41. Since the traffic information bit of 1 means that there is the data batch, the paging receiver turns on the RF until 41. The AM/PM information is one bit, hour information is 4 bits, 10-minute information is 4 bits, one-minute information is 4 bits, and a checksum bit is 4 bits. The checksum bit is used to determine whether header information data of 16 bits, that is, the slot, traffic and AM/PM information, hour information, 10-minute information and 1-minute information, has an error. If a value added by the unit of 4 bits (nibble) is over 16, that value is discarded, and only a value between 0 to 15 is transmitted. The paging receiver determines whether the information is effective by comparing the 16 most significant bits with a checksum value.

Figure 11:
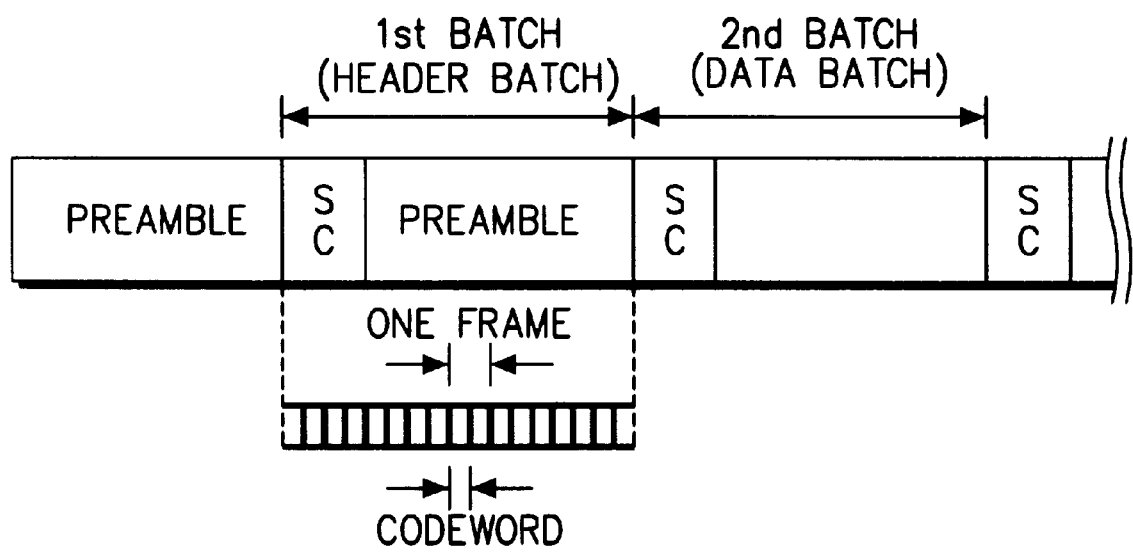
FIG. 11 illustrates a form of a POCSAG code of a battery saving type at a FLEX combined channel according to an embodiment of the present invention.

Referring now to FIG. 11, a form of a POCSAG code of a battery saving type at a FLEX combined channel according to an embodiment of the present invention is shown. The first batch following the preamble is the header batch which consists of a synchronization code (SC) and 8 frames. Each frame consists of 2 codewords. Each batch consists of 17 codewords. The remainder of the batches following the header batch are the data batches.

Figure 12:
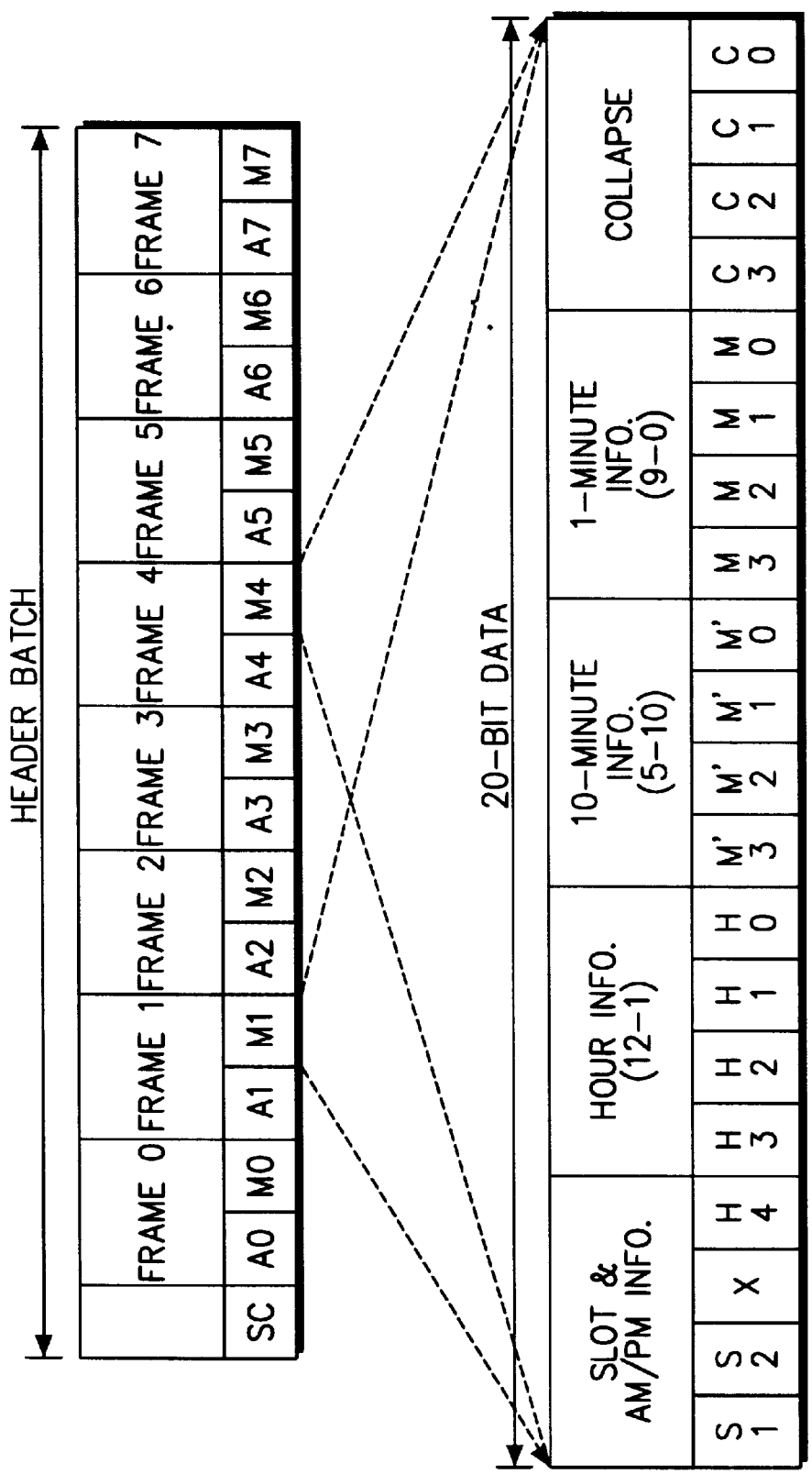
FIG. 12 illustrates a structure of a header batch in the POCSAG code shown in FIG. 11.

Referring now to FIG. 12, a structure of the header batch in the POCSAG code of FIG. 11 is shown. It is assumed that one minute (32 frames) is one period and the length of one time slot is 15 seconds and 4 time slots forms one time slot group. Each time slot has the header batch as shown in FIG. 12. There are two slot information bits that are assigned to the message data constituting the frame of the header batch. For example, if the slot information bits S0 of 1 and S1 of 0 are assigned to message data M1 constituting the first frame of the header batch of the first time slot, it will be appreciated that the transmitted data belongs to the first time slot.

In addition to the slot information, the AM/PM information consists of one bit, the hour information consists of 4 bits, the 10-minute information consists of 4 bits, the one-minute information consists of 4 bits, and the collapse information consists of 4 bits. There are bits assigned to the hours, minutes and seconds in order to transmit accurate time information because a FLEX paging system uses the GPS information. The collapse bits are characteristic of a FLEX form of operation. Consequently, a paging receiver at the FLEX combined channel detects the time slot number and the collapse bits from the header batch following the preamble and previously senses the transmission time of FLEX data. Therefore, the paging receiver can turn the RF unit 41 off while the FLEX data is transmitted.

The following Table 1 and Table 2 show the state and contents of the collapse bits and time slots.

TABLE 1

| C3 | C2 | C1 | C0 | Contents |
|----|----|----|----|----------|
| 0 | 0 | 0 | 0 | FLEX Combined Channel 0 |
| 0 | 0 | 0 | 1 | FLEX Combined Channel 1 |
| 0 | 0 | 1 | 0 | FLEX Combined Channel 2 |
| 0 | 0 | 1 | 1 | FLEX Combined Channel 3 |
| 0 | 1 | 0 | 0 | FLEX Combined Channel 4 |
| . | . | . | . | Not Used |
| . | . | . | . |  |
| . | . | . | . |  |
| 0 | 1 | 1 | 1 | Not Used |

TABLE 2

| S0 | S1 | Contents |
|----|----|----------|
| 0 | 0 | Time Slot 1 |
| 0 | 1 | Time Slot 2 |
| 1 | 0 | Time Slot 3 |
| 1 | 1 | Time Slot 4 |

Figure 13:
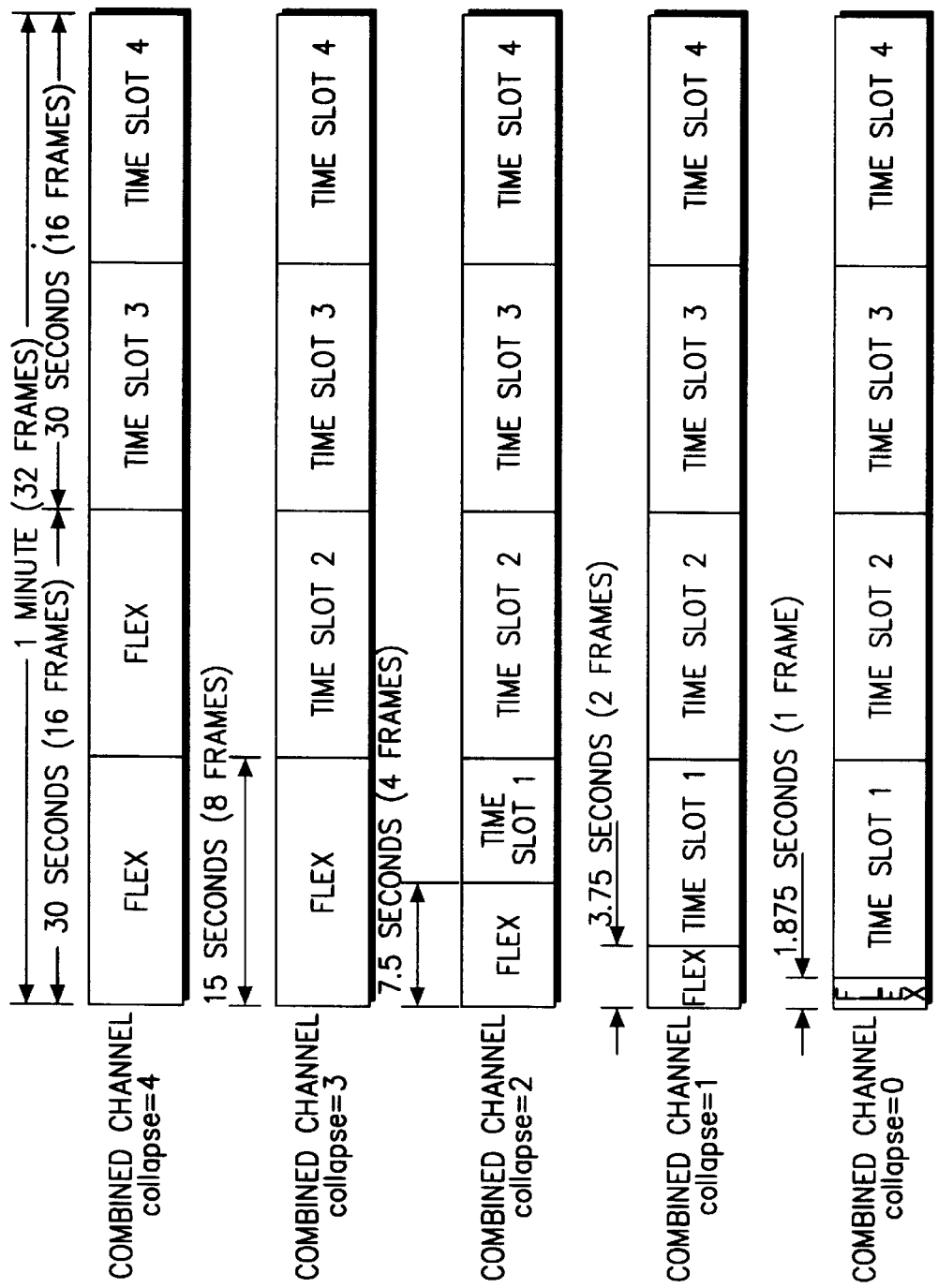
FIG. 13 illustrates a plurality of forms for receiving data of first to fifth FLEX combined channels.

FIG. 13 illustrates data receiving forms of first to fifth FLEX combined channels. The fifth FLEX combined channel has the collapse information of 4. Assuming that one minute (32 frames) is the duration for one period, FLEX data is transmitted during the first 30 seconds (16 frames) and POCSAG data is transmitted during the next 30 seconds. The transmitted POCSAG data comprises two time slots (i.e., time slots 3 and 4 in FIG. 13) each having a duration of 15 seconds. The FLEX data is transmitted during the time corresponding to time slot 1 and time slot 2. Therefore, with regard to the POCSAG system, the POCSAG paging receiver does not have to operate when the Flex data is being transmitted (i.e., during the time corresponding to time slot 1 and time slot 2).

The fourth FLEX combined channel has the collapse information of 3. The FLEX data is transmitted during the first 15 seconds (8 frames) and the POCSAG data is transmitted during the next 45 seconds. As shown, the POCSAG data is transmitted during time slot 2 through time slot 4.

The third FLEX combined channel has the collapse information of 2. The FLEX data is transmitted during the first 7.5 seconds (4 frames) and the POCSAG data is transmitted during the next 52.5 seconds. Specifically, as shown, the POCSAG data is transmitted for 7.5 seconds during time slot 1 and during the 15 seconds for each time slot 2, 3, and 4.

The second FLEX combined channel has the collapse information of 1. The FLEX data is transmitted during the first 3.75 seconds (2 frames) and the POCSAG data is transmitted during the next 56.25 seconds. Specifically, the POCSAG data is transmitted during 11.25 seconds of time slot 1 and 15 seconds for each of time slots 2, 3, and 4.

The first FLEX combined channel has the collapse information of 0. The FLEX data is transmitted during the first 1.875 seconds (1 frame) and the POCSAG data is transmitted during the next 58.125 seconds. Specifically, the POCSAG data is transmitted during time slot 1 through time slot 4. The time slot 1 is transmitted only during 13.125 seconds. In each of the above combined channels, the length of the FLEX data is calculated by multiplying the collapse information k by two, i.e., 2 k. In particular, the length of the FLEX data is 1, 2, 4, 8 and 16 frames.

Figure 14:
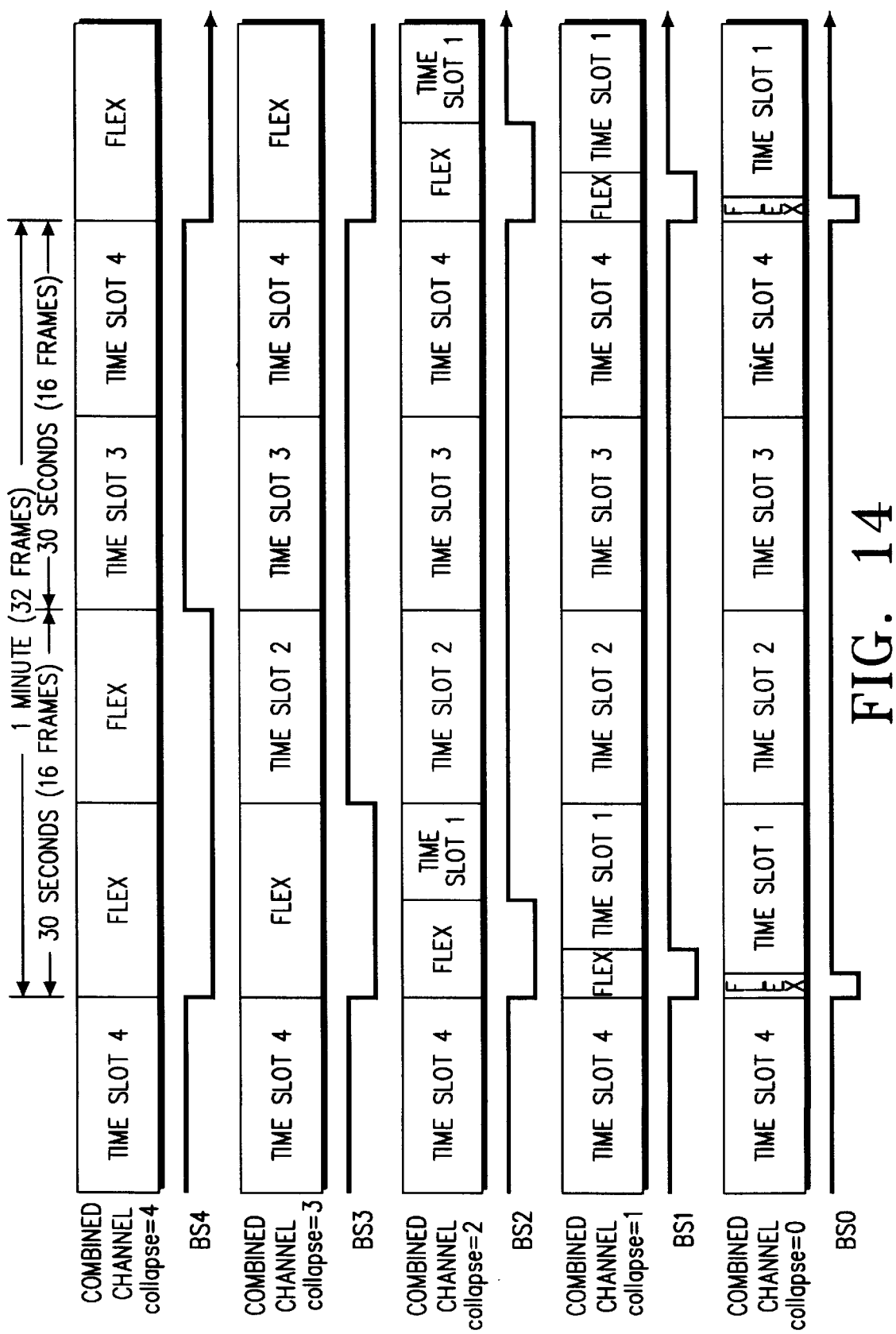
FIG. 14 illustrates waveform charts of battery saving signals of a POCSAG paging receiver at FLEX combined channels in accordance with an embodiment of the present invention.

Referring now to FIG. 14, waveform diagrams of battery saving signals of the POCSAG paging receiver at the FLEX combined channels are shown. The battery saving waveforms (i.e., BS4, BS3, BS2, BS1, and BS0) are maintained at a low state while the FLEX data is received. In other words, while the FLEX data is received, the RF unit 41 is turned off so as to prevent the unnecessary consumption of battery power. This operation is possible by previously sensing the transmission of the FLEX data. For this, the slot information bits S0 and S1 contained in any frame in the header batch of FIG. 12 are detected.

Figure 15:
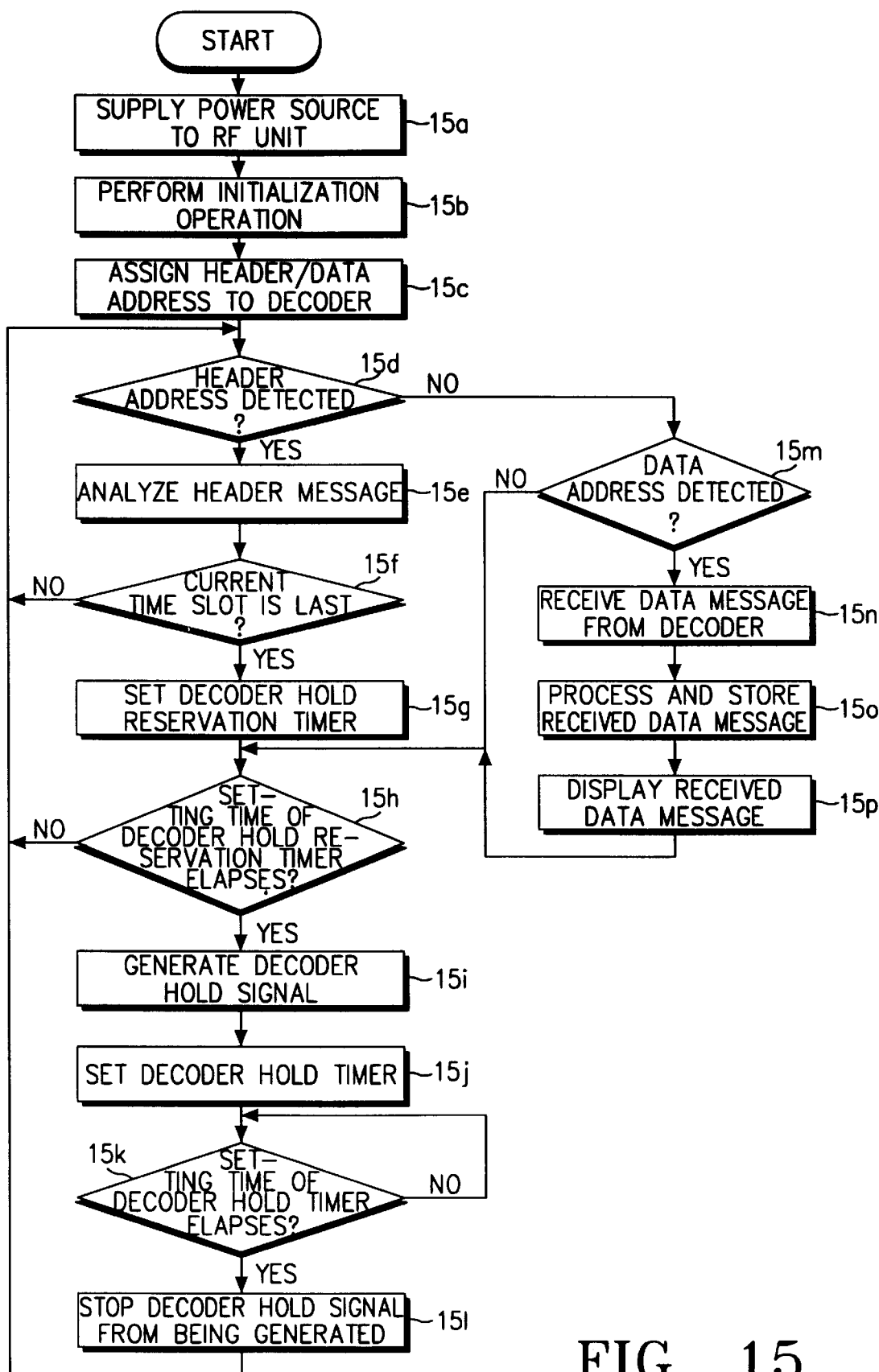
FIG. 15 is a flow diagram of a battery saving method of a paging receiver in accordance with an embodiment of the present invention.

Referring now to FIG. 15, a flow diagram of a battery saving process of the paging receiver is shown. The controller 44 of the paging receiver supplies power to the RF unit 41 (step 15a) and performs an initialization operation (step 15b). Next, the header/data address (or CAP code) is assigned to the decoder 56 so as to receive the header batch and the data batch from the signal received through the RF unit 41 (step 15c). The decoder 56 transmits the data message to the controller 44 by detecting the data address after the preamble is detected. The controller 44 determines whether the header address is detected (step 15d). If the header address is detected (affirmative result at step 15d), the header message is analyzed (step 15e). Next, a determination is made as to whether the current time slot is the final one (step 15f). Preferably, if the time slot number is 4 or more, the current time slot is deemed to be the final time slot. The final time slot means that the FLEX data is transmitted after the corresponding time slot. A decoder hold reservation timer is then set in order to hold the decoder 56 after a constant time (step 15g). The setting of the decoder hold reservation timer is done before the decoder 56 is held.

Next, the decoder hold reservation timer is checked to see if its setting time elapses (step 15h). If the time has elapsed (affirmative result at step 15h), the decoder hold signal DH is generated to turn off the RF unit 41 (step 15i). The decoder hold timer is then set (step 15j). A determination is then made as to whether a setting time of the decoder hold timer elapses (step 15k). If the setting decoder hold time elapses (affirmative result at step 15k), the decoder hold signal DH is stopped from being generated (step 15l) so as to supply a normal power source to the RF unit 41. Thereafter, the process returns to step 15d. On the other hand, if the setting time of the decoder hold timer does not elapse (negative result at step 15k), the controller 44 continues to check the decoder hold timer until the setting time elapses.

Referring back to step 15d, if the header address is detected but the current time slot is not the final time slot (negative result at step 15f), process returns to step 15d. In this situation, the header address will not be detected (negative result in step 15d) because the header address has already been detected. Therefore, the data address following the header address will be detected (step 15m). A determination is made as to whether the data address is detected (step 15m). If the data address is detected (affirmative result in step 15m), the data message is received from the decoder (step 15n). The received data message is processed and stored (step 15o). The received data message is then visually displayed and aurally transmitted by controlling the display unit 45 and the alarm unit 43 (step 15p). After the message is displayed (15p), or if the data address is not detected (negative result at step 15m), it is determined whether the setting time of the decoder hold reservation timer elapses (step 15h).

Consequently, the POCSAG paging receiver used in the combined channel turns off the RF unit when a data type obtained by checking the preamble and the header batch is a FLEX type and turns on the RF unit only when the data type is a POCSAG type. Therefore, unnecessary power consumption can be prevented.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An apparatus for saving battery power of a paging receiver having a radio frequency unit, comprising:
    a paging receiver having a battery saving controller connected to the radio frequency unit for controlling a supply of power to the radio frequency unit;
    a paging terminal for receiving a paging message, generating a POCSAG code in accordance with said paging message and sequentially assigning a corresponding time slot for transmission of said POCSAG, said POCSAG code having preamble data, a header batch and at least one data batch following said preamble, said header batch having time slot information associated with said paging receiver, said header batch includes traffic information to indicate one of the presence and absence of said data batches in said POCSAG code, whereby said battery saving controller turns off the power source of the radio frequency unit during a next time slot from the data batch of a corresponding time slot if the time slot information of the header batch is identical to its own time slot information and the traffic information indicates that there is no data batch, whereby said paging receiver receives said POCSAG code transmitted from said paging terminal and detects said header batch, said paging receiver controlling said battery power of said radio frequency unit in accordance with said time slot information contained in said header batch.

2. The apparatus as claimed in claim 1, further comprising:
    switching means, operatively connected to said paging terminal, for providing said paging terminal with said paging message;
    a global positioning system, operatively connected to said paging terminal, for providing said paging terminal with information to determine said corresponding time slot for transmission of said POCSAG code of said paging message; and
    a base station unit, operatively connected to said paging terminal, for receiving said transmitted POCSAG code of said paging message from said paging terminal and sending said POCSAG code to said paging receiver during said corresponding time slot associated with said time slot information.

3. The apparatus as claimed in claim 1, wherein said paging terminal includes a page queue for temporarily storing a paging message in a standby state to be transmitted during said corresponding time slot.

4. The apparatus as claimed in claim 1, wherein said paging receiver comprises:
    a pattern detector for sequentially detecting said preamble, said header batch and data batches from said POCSAG code of said paging message transmitted from said paging terminal;
    a controller having a timer, for sensing the state of a time slot repeated with constant time length in accordance with said timer, and generating a decoder hold signal when said time slot information of said detected header batch is not identical to said time slot information associated with said paging receiver; and
    a decoder for generating a signal to cause said battery saving controller to cut off the power supplied to said radio frequency unit upon an input of said decoder hold signal.

5. The apparatus as claimed in claim 4, whereby said controller of said paging receiver sets a decoder hold timer when said decoder hold signal is generated, and said controller generates a decoder hold release signal so as to receive the POCSAG code of the next time slot if said setting time of said timer elapses.

6. The apparatus as claimed in claim 1, wherein said POCSAG code is transmitted in one of an even-numbered time slot and an odd numbered time slot, said POCSAG code of said even-numbered time slot having said header batch with address and message data conveyed in even frames and said POCSAG code of said odd-numbered time slots having said header batch with address and message data conveyed in odd frames.

7. The apparatus as claimed in claim 6, wherein said header batch includes one of time slot information, traffic information, hour information received from said global positioning system, a checksum value and a combination thereof.

8. The apparatus as claimed in claim 6, wherein said paging receiver determines whether said message data is effective by comparing more significant bits constituting said message data with said checksum value.

9. An apparatus for saving a battery in a paging receiver of a POCSAG type having a radio frequency unit for communicating with a paging terminal through a combined channel, said apparatus comprising:
    a battery saving controller for controlling power supplied to said radio frequency unit;
    an external clock for providing time information to said paging terminal;
    switching means for providing said paging terminal with a paging message;
    a pattern detector for sequentially detecting a preamble, a header batch having time slot data, and a data batch in a signal transmitted from said paging terminal;
    a controller for determining whether said data batch is data of the POCSAG type based on said time slot data contained in said header batch, and causing said battery saving controller to turn off the power source of said radio frequency unit when said time slot data of said header batch does not correspond to data of said POCSAG type, said controller includes a timer for sensing a state of said time slot repeated with constant time length in accordance with said external clock, and said controller senses a transmission time of FLEX data according to said time slot number of the detected header batch, and generates a decoder hold signal during said transmission time and prevents said decoder hold signal during transmission time of said POCSAG data; and
    a base station unit, wherein said paging terminal converts said paging message received from said switching means into one of a FLEX and POCSAG code according to a combined channel operation type, determines an accurate time slot for transmission of said paging message by using said time information received from said external clock, and transmits said FLEX or POCSAG code to said paging receiver through said base station unit during said corresponding time slot.

10. The apparatus as claimed in claim 9, further comprising a decoder for generating a signal to cause said battery saving controller to cut off the power source supplied to said radio frequency unit upon an input of said decoder hold signal.

11. The apparatus as claimed in claim 9, wherein said controller sets a decoder hold timer when said decoder hold signal is generated, whereby said controller generates a decoder hold release signal so as to receive the POCSAG code of the next time slot if said setting time of said timer elapses.

12. The apparatus as claimed in claim 9, wherein said header batch includes data for determining a combined channel operation type.

13. The apparatus as claimed in claim 9, wherein said external clock for providing time information to said paging terminal is a global positioning system.

14. A method for saving a battery in a paging receiver having a decoder for decoding frame data to an original paging message, determining whether a data batch is POCSAG data based on a time slot number contained in a header batch, and means for communicating with a paging terminal through a combined channel, said method comprising the steps of:
   (a) supplying a power source to a radio frequency unit, and assigning a header address for receiving the header batch and a data address for receiving the data batch to said decoder;
   (b) determining whether one of the header address and the data address is detected;
   (c) holding said decoder and setting a time of a decoder hold timer if only the header address is detected, said holding step further comprising the steps of:
      (1) checking the header message to see if a current time slot is the last if the header address is detected;
      (2) setting a time of a decoder hold reservation timer if the current time slot is the last;
      (3) determining if said setting time of said decoder hold reservation timer elapses, and if one of the current time slot is not the last and the setting time of said decoder hold reservation timer does not elapse, returning to said step (b); and
      (4) if the setting time of said decoder hold reservation timer elapses, turning to said step (c), and
   (d) checking the time of said decoder hold timer, and if the setting time of said decoder hold timer elapses, releasing a hold state of said decoder and returning to step (b).

15. The method as claimed in claim 14, further comprising the step of, if the data address is detected and the current time slot is the last, receiving the data message from said decoder, processing and displaying the received data message, and returning to step (3).

* * * * *